United States Patent [19]
Winkel

[11] Patent Number: 4,729,344
[45] Date of Patent: Mar. 8, 1988

[54] ANIMAL FEEDER

[75] Inventor: Robert M. Winkel, Niles, Mich.

[73] Assignee: Vel-Agri, Inc., Niles, Mich.

[21] Appl. No.: 703,768

[22] Filed: Feb. 21, 1985

[51] Int. Cl.⁴ .............................................. A01K 5/00
[52] U.S. Cl. .............................. 119/53.5; 119/52 A; 119/52 B
[58] Field of Search ...................... 119/53.5, 54, 52 A, 119/52 R, 53, 52 B, 56 A, 56 R

[56] References Cited

U.S. PATENT DOCUMENTS

| | | | |
|---|---|---|---|
| 368,161 | 8/1887 | Nichols | 119/53.5 |
| 655,477 | 8/1900 | Combs | 119/53.5 |
| 920,806 | 5/1909 | Wright | 119/53.5 |
| 950,518 | 3/1910 | Seiffert | 119/54 |
| 1,132,973 | 3/1915 | Sieffert | 119/54 |
| 1,194,053 | 8/1916 | Meyer | 119/54 |
| 1,341,887 | 6/1920 | Dohm | 119/53.5 |
| 1,825,633 | 8/1928 | McDougall | 119/54 |
| 1,879,247 | 9/1932 | Holiday | 119/54 |
| 2,153,455 | 4/1938 | Casper | 119/54 |
| 2,158,253 | 8/1938 | Reynolds | 119/53.5 |
| 3,001,410 | 9/1961 | Letson | 129/56 R |
| 3,638,617 | 2/1972 | White | 119/51 |
| 4,353,329 | 10/1982 | Thibault | 119/52 A |
| 4,444,151 | 4/1984 | Bohlman | 119/53.5 |
| 4,462,338 | 7/1984 | Thibault | 119/53.5 |

FOREIGN PATENT DOCUMENTS

| | | | |
|---|---|---|---|
| 202191 | 8/1923 | United Kingdom | 119/54 |
| 206561 | 11/1923 | United Kingdom | 119/53.5 |
| 347487 | 4/1931 | United Kingdom | 119/54 |
| 737101 | 9/1955 | United Kingdom | 119/53.5 |

Primary Examiner—Paul J. Hirsch
Attorney, Agent, or Firm—James D. Hall

[57] ABSTRACT

An animal feeder which includes a trough and a feed-containing hopper. The trough includes a rotatable feed wheel connected to a rotatable distributor plate which dispenses the feed from the hopper into the trough. The hopper includes up to three stationary deflectors which limit the amount of feed bearing on the distributor plate at one time to assure a steady, continuous flow of feed from hopper to trough. The position of the distributor plate is also adjustable to vary the predetermined flow rate of feed.

10 Claims, 8 Drawing Figures

ANIMAL FEEDER

BACKGROUND OF THE INVENTION

This invention relates to an animal feeder and will have application to a feeder which is operated by the animal and which dispenses the feed at a predetermined rate.

Animal feeders which utilize gravity-induced feed flow are well known in the art of husbandry. Such feeders included a rotatable feed wheel positioned within a feed-receiving trough below a hopper which contained a supply of feed. As the animal during feeding turned the feed wheel with its head, the feed in the hopper was agitated and fell into the feed-receiving trough for consumption by the animal. Such feeders also included a deflector positioned within the hopper to control feed flow into the feed-receiving trough. Feeders of this nature are disclosed in U.S. Pat. Nos. 1,222,556; 2,153,455; 2,484,967; 4,353,259 and 4,462,338.

A disadvantage of some of these feeders is that due to the weight of feed in the hopper, the feed tends to "bridge" and further distribution into the trough is sporadic and difficult to achieve by animal manipulation of the feed wheel.

SUMMARY OF THE INVENTION

The animal feeder of this invention utilizes a rotatable feed wheel positioned within a feed-receiving trough. A hopper which houses the animal feed is positioned above the trough and includes a dispensing opening at the hopper bottom. A stationary deflector is mounted above the hopper dispensing opening. A rotatable distributor plate is positioned at a level below the hopper dispensing opening. The feed wheel is connected in a manner to the distributor plate so that rotational movement of the wheel by the animal causes rotation of the plate and the corresponding flow of feed from the plate into the trough. The deflector prevents feed buildup within the hopper, thus assuring feed flow onto the distribution plate.

Accordingly, it is an object of this invention to provide for an improved animal manipulated feeder.

Another object of this invention is to provide for an animal feeder which provides a steady rate of animal induced feed flow.

Another object of this invention is to provide for an animal feeder which allows for an adjustable rate of feed flow.

Other objects of this invention will become apparent upon a reading of the following description.

BRIEF DESCRIPTION OF THE DRAWINGS

A preferred embodiment of the invention has been chosen for purposes of illustration wherein.

DESCRIPTION OF THE PREFERRED EMBODIMENT

Figure 1:
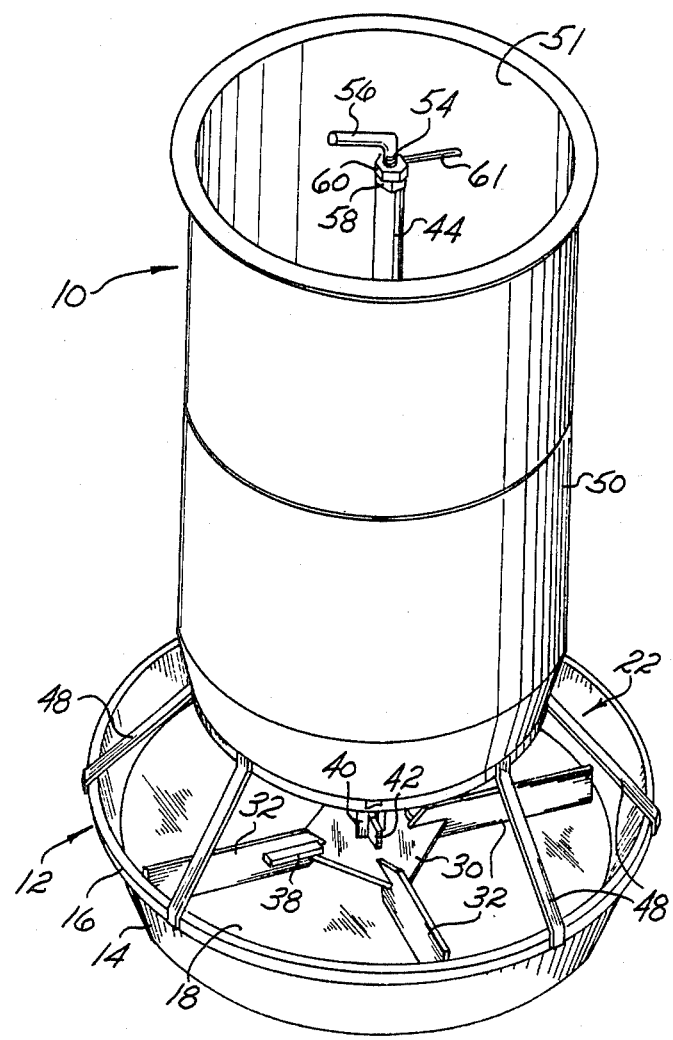
FIG. 1 is a perspective view of the animal feeder of this invention.

The preferred embodiment herein described is not intended to be exhaustive or to limit the invention to the precise form disclosed. It is chosen and described to explain the principles of the invention and its application and practical use to enable others skilled in the art to utilize the invention.

The animal feeder 10 depicted in FIGS. 1-8 includes a generally circular base 12 defined by a side wall 14 and a bottom wall 18. Side wall 14 includes an upper circumferential rim 16. Base bottom wall 18 includes a centrally located raised portion 20 and with base side wall 14 forms a feed-receiving trough 22.

A spacer plate 24 is positioned upon raised portion 20 of base 12 and a bearing plate 25 is positioned upon spacer plate 24. A feed wheel 30 is positioned upon bearing plate 25 and includes a downwardly extending central post 26. Post 26 is fitted through concentric holes in bearing plate 25, spacer plate 24 and raised wall portion 20 and is secured by cotter pin 28 against vertical movement. Wheel 30 includes a plurality of radially extending spokes 32. A bar 38 is affixed to each spoke 32 and serves to strengthen the spoke. A drive bar 42 is connected to the upper surface 31 of feed wheel 30 over the pivot axis of post 26.

A hopper 50 is supported above trough 22 by supports 48. Hopper 50 houses a quantity of animal feed 52 and is constructed of generally cylindrical shape. A vertical tube 44 extends through the center of hopper 50 and includes a pair of spaced legs or guide members 40 at its lower end which straddle drive bar 42. A rod 46 extends through tube 44 with its lower end portion 45 abutting drive bar 42 and its upper end portion 54 being formed into a handle 56. A nut 58 is welded to the top of tube 44. A retainer nut 60 is turned upon rod 46 above nut 58. Rod 46 is threadably connected to nut 58. Hopper 50 includes a downwardly tapered annular recessed bottom wall 64 which has a centered discharge opening 62. An annular downwardly tapered deflector plate 65 is fastened to hopper side wall 51 spacedly below hopper bottom wall 64.

A distributor plate 68 extends equally radially from and is carried by tube 44 at a position below hopper bottom wall 64 and generally at the level of deflector plate 65. Distributor plate 68 is connected by fasteners 70 to a support plate 72 which in turn, is connected as by welding to tube 44. A strap like bracket 74 is secured within hopper 50 by fasteners 76. A guide bracket 78 overlies tube 44 and is attached by fasteners 80 to bracket 74. In this manner tube 44 is maintained in an upright rotatable position. A plurality of supports 82 depend from bracket 74 and are attached to a frusto-conical shaped deflector 84 positioned above hopper bottom wall 64. The outer edge 85 of delector 84 extends beyond the discharge opening 62 in hopper 50. Tube 44 extends freely through deflector 84. Rotative movement of wheel 30 within trough 22 causes tube 44 and attached distributor plate 68 to rotate.

Figure 2:
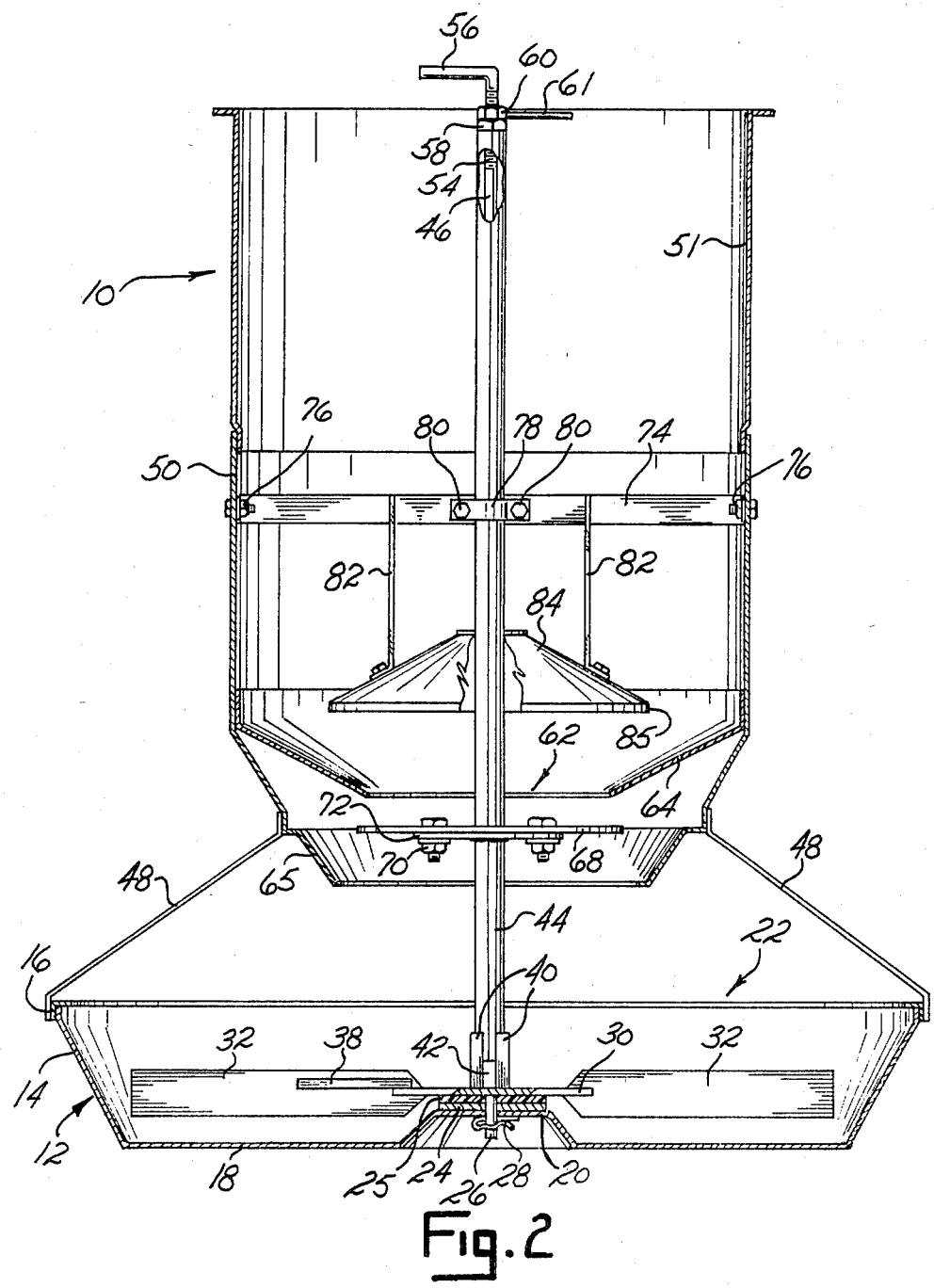
FIG. 2 is a vertical sectional view of the animal feeder.
Figure 3:
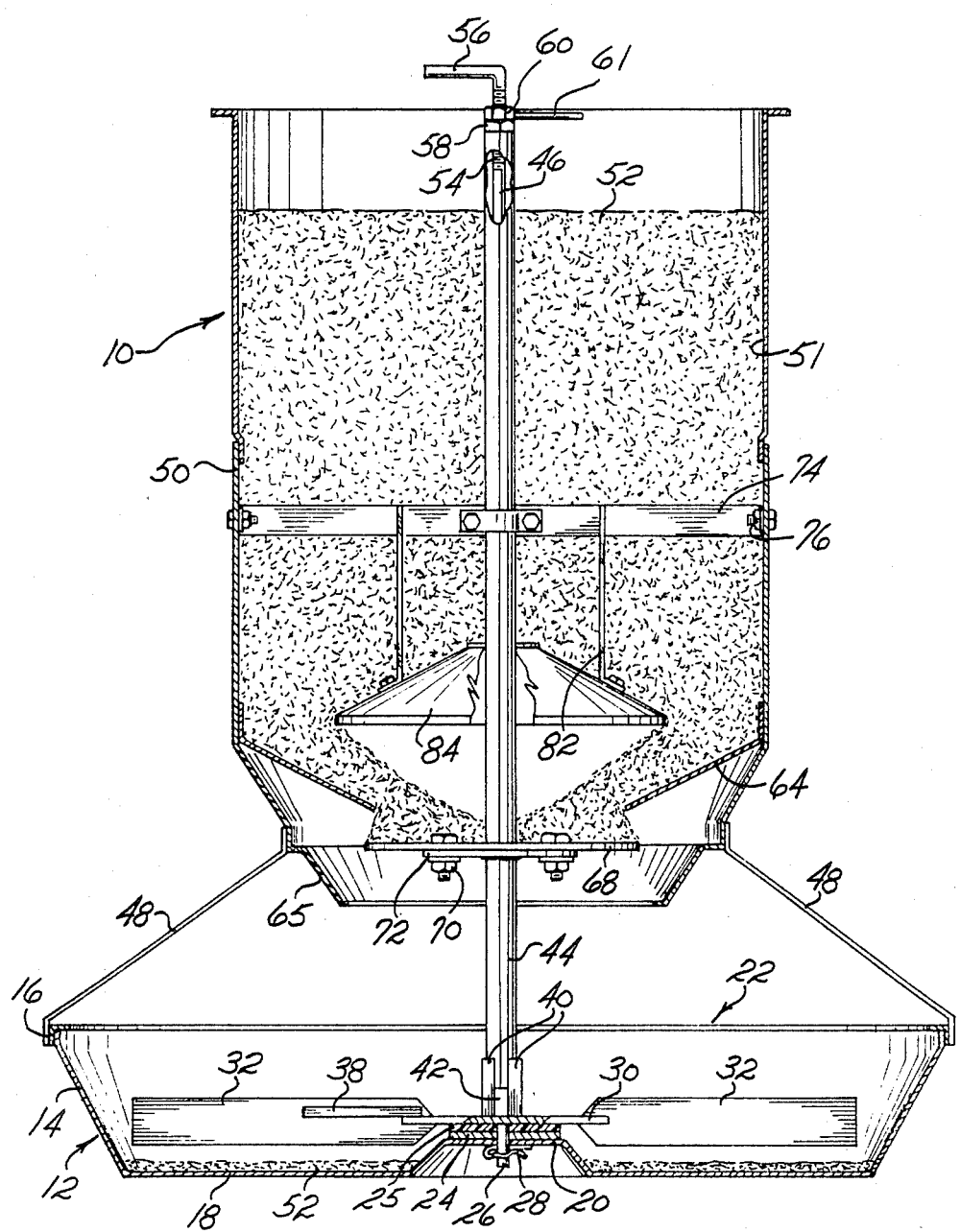
FIG. 3 is a vertical sectional view of the animal feeder, showing the hopper thereof stocked with feed.
Figure 4:
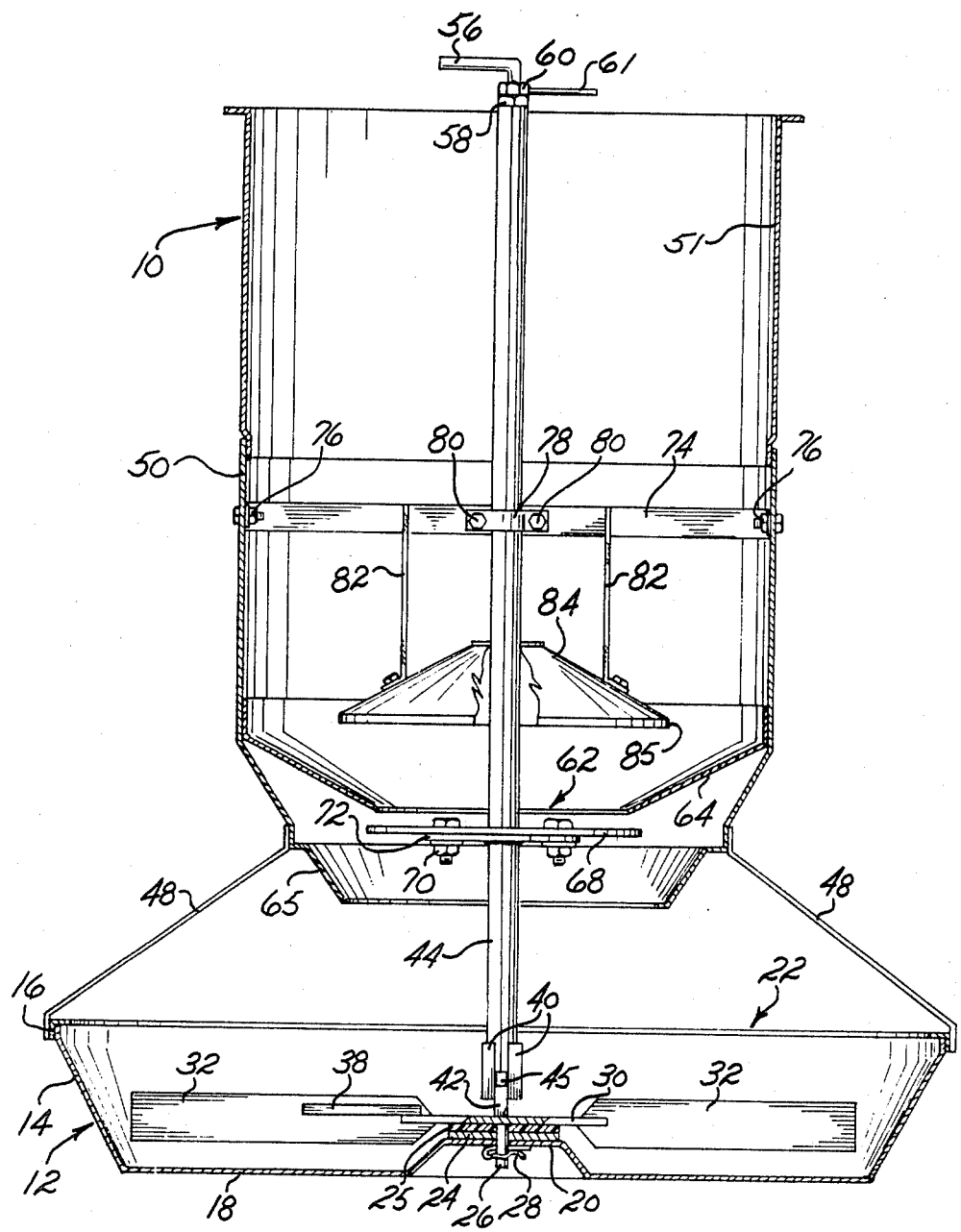
FIG. 4 is a vertical sectional view of the animal feeder shown in a reduced feed flow condition.
Figure 5:
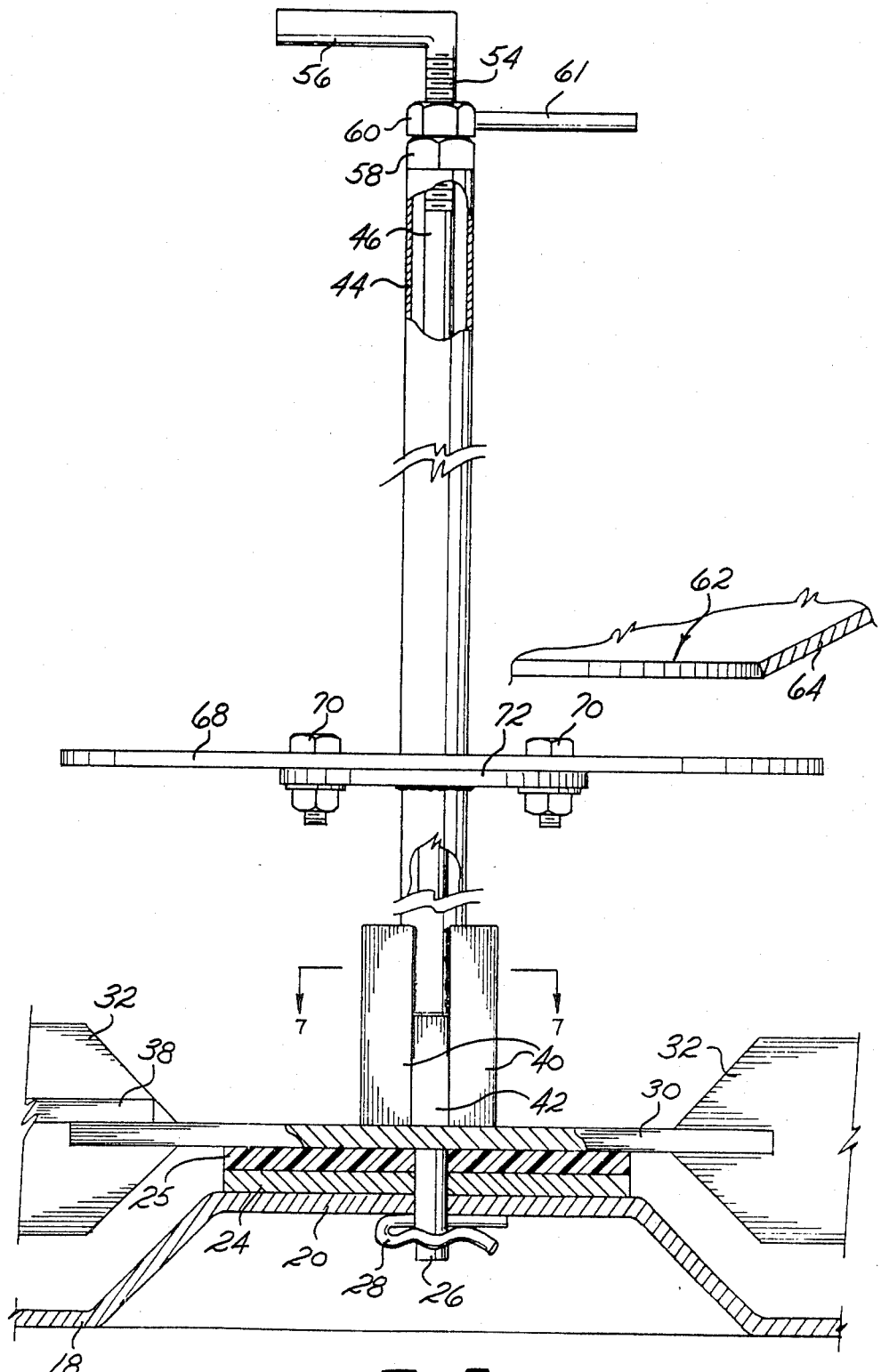
FIG. 5 is a fragmentary detailed sectional view of the distributor plate and wheel of the feeder in a feed flow condition.
Figure 6:
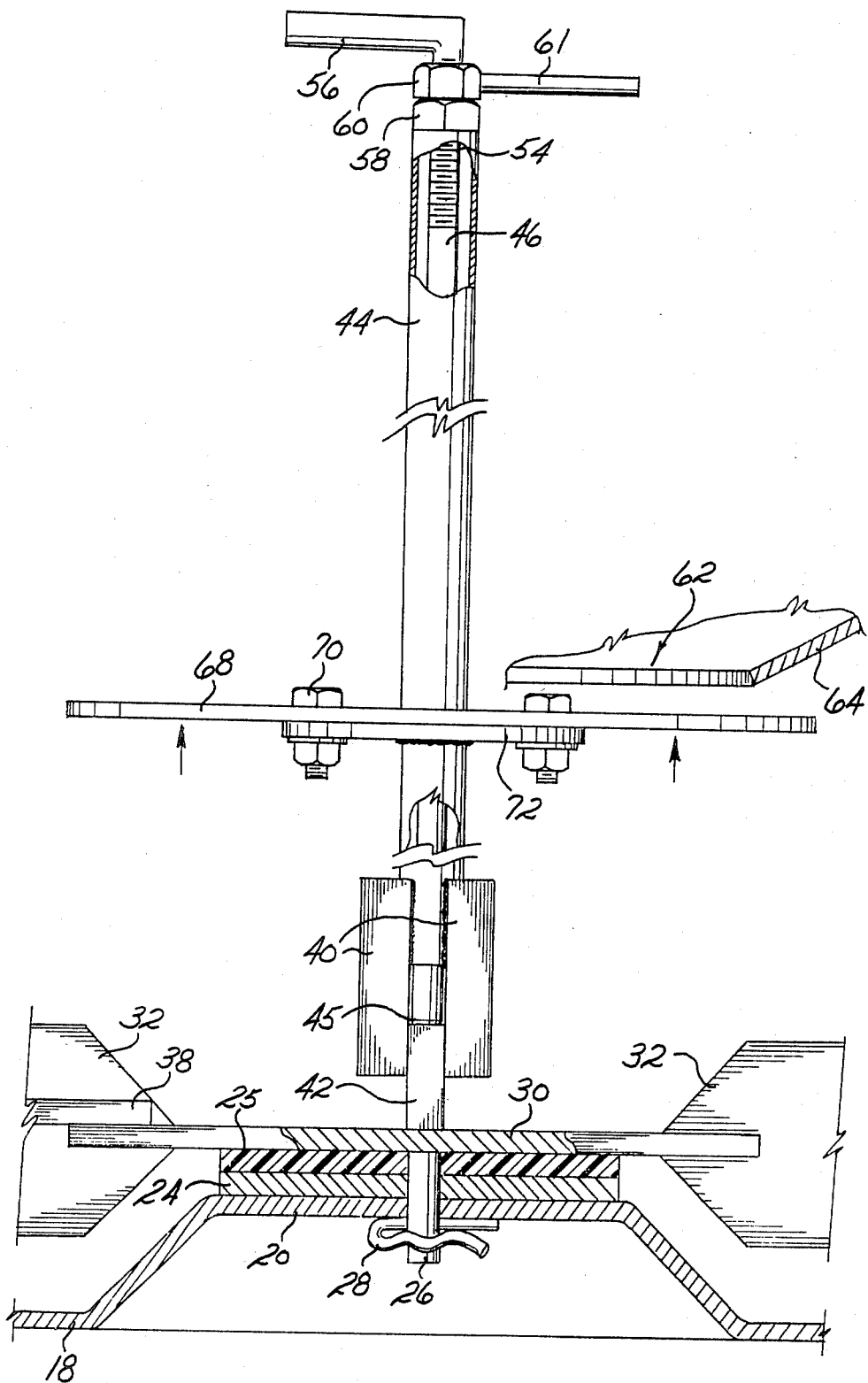
FIG. 6 is a view similar to FIG. 5 showing the plate and wheel in a reduced feed flow condition.
Figure 7:
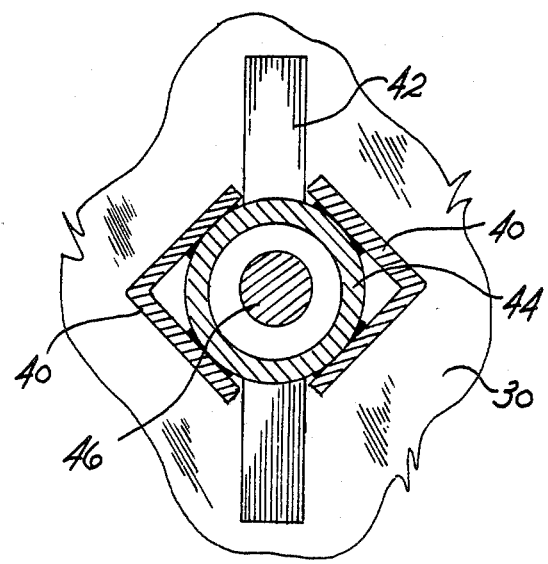
FIG. 7 is a cross sectional view taken along line 7—7 of FIG. 5.
Figure 8:
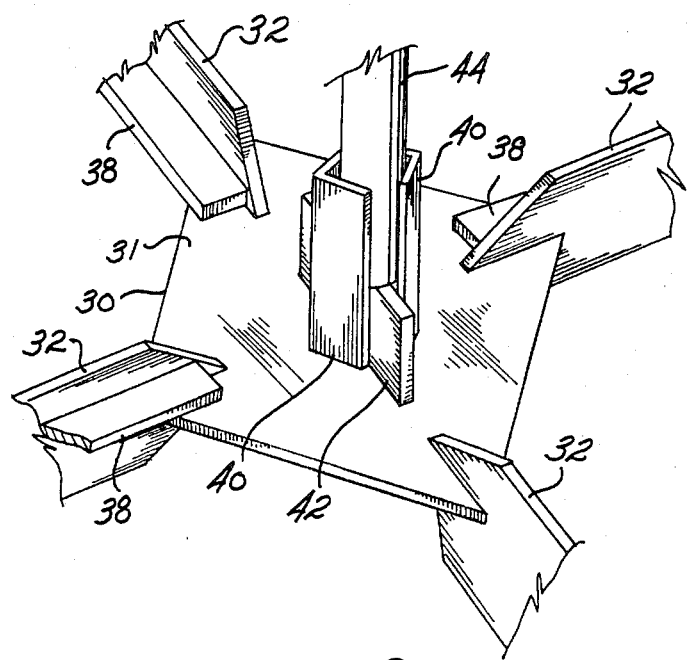
FIG. 8 is a fragmentary perspective view of the feed wheel and distributor plate drive.

Animal feeder 10 is operated as follows. With the distributor plate 68 in the reduced flow position of FIGS. 4 and 6, a farmer loosens nut 60 by turning handle 61 connected to the nut. Handle 56 is then turned within nut 58 and tube 44 to cause the tube and connected plate 68 to be lowered. Locking nut 60 is then tightened when distributor plate 68 is located at its desired spacing from discharge opening 62 of hopper 50, such as seen in FIGS. 2 and 3. The position of distributor plate 68 allows a selected amount of feed 52 to flow through feed discharge opening 62 onto plate 68. As an animal, such as a hog, contacts a sopke 32 of feed wheel 30 with its snout, the wheel and distributor plate 68 turn to cause feed 52 upon the plate to be thrown outwardly from the plate where it contacts and is directed by deflector plate 65 downwardly into trough 22.

The amount of feed dispensed from hopper 50 may be varied by the vertical positioning of distributor plate 68 with respect to discharge opening 66. Due to the position of deflector 84, bridging of feed 52 within hopper 50 is prevented to assure a steady flow of feed through hopper discharge opening, onto distributor plate 68 and into trough 22. When it is desired to stop the feed flow, nut 60 is loosened and handle 56 is turned in the opposite direction, raising tube 44 and connected dispersion plate 68 toward hopper bottom 64 to cut off feed flow through discharge opening 62. Driving contact between wheel 30 and tube 44 is maintained at all times due to the saddling effect of guide member 40 over drive bar 42. Deflector 65 prevents the feed from being thrown centrifugally from distributor plate 68 over trough 22.

It is to be understood that the above description does not limit the invention to the precise details given, but may be modified within the scope of the appended claims.

I claim:

1. In a feeder for dispensing feed to animals including a hopper for storing the feed to be dispensed, said hopper including a feed discharge opening, a feed receiving trough positioned beneath said hopper, a rotatable wheel positioned within said trough, the improvement comprising a generally horizontal distributor plate below said hopper discharge opening, said distributor plate positioned between said hopper discharge opening and said trough, said wheel and distributor plate connected for joint turning about a common axis, said distributor plate constituting means for centrifugally throwing said feed outwardly into said trough upon turning of said wheel, a drive member aligned with said axis connected to said distributor plate and extending to said wheel, means for raising and lowering said distributor plate and attached drive member to vary the spacing between said hopper discharge opening and the distributor plate, a slide connection between said drive member and wheel wherein turning of the wheel causes turning of the drive member and connected distributor plate.

2. The animal feeder of claim 1 and first deflector means positioned about said distributor plate, said first deflector means for directing feed thrown outwardly from said distributor plate into said trough.

3. The animal feeder of claim 1, and a deflector positioned within said hopper above said hopper discharge opening.

4. The animal feeder of claim 1 wherein said slide connection includes a vertical drive bar carried by the wheel, said drive member including legs straddling said drive bar in all operative positions of the distributor plate.

5. The animal feeder of claim 4 wherein said drive member is a tube which extends upwardly into said hopper, a rod extending within said tube and abutting said drive bar, said rod being threadably connected to said rod for raising and lowering the tube relative to the rod upon turning the rod relative to the tube.

6. The animal feeder of claim 5 and bracket means positioned within said hopper for supporting said tube in a generally upright turnable position.

7. The animal feeder of claim 6 and second deflector means positioned about said tube and supported by said bracket means, said third deflector means for controlling the amount of feed delivered to said distribution plate.

8. The animal feeder of claim 7 wherein said second deflector means is stationarily connected to said bracket means.

9. The animal feeder of claim 1 and a plurality of spokes extending radially from said wheel, said spokes constituting animal contacting means for rotating said wheel.

10. The animal feeder of claim 1 wherein said slide connection between said drive member and wheel constitutes means for accommodating said raising and lowering of said distributor plate and attached drive member.

* * * * *